Patented Dec. 1, 1936

2,062,903

UNITED STATES PATENT OFFICE 2,062,903

DYEING PROCESS

James Otis Handy, Larchmont, N. Y.

No Drawing. Application September 23, 1935,
Serial No. 41,662

6 Claims. (Cl. 99—103)

This invention relates to dyeing compositions and processes for dyeing, and relates particularly to the dyeing of the surface of harvested food products preparatory to marketing.

It is well known that certain natural, harvested food products, and especially those of the citrus fruit family, such as oranges, grapefruit, lemons and the like, vary greatly in color and in many instances, although ripe, they do not have an attractive, uniform color when harvested. It is often desirable to enhance or modify the color of harvested fruit in order to impart a more attractive appearance thereto and to insure that all of the units of a single shipment shall have a uniform color.

It is especially desirable that the coloring operation be carried out with harmless and, preferably, certified food colors, that the color produced be natural, uniform and permanent, and that the process be capable of satisfactory, economical operation under plant conditions.

It has been proposed heretofore to color fruit by presenting the dye to the fruit in the form of a solution in a "non-aqueous" solvent, such as an organic liquid, for example, kerosene, with the thought that successful coloring of fruit depends on the removal by the dye solvent of the obstructing or repelling oily or waxy constituents of the skin before the dye can be deposited. The faultiness of this theory is apparent when one considers that the application of a penetrating solvent for the oil of the fruit rind would carry the dye into the cells and color the oil in the separate cells, and thus disfigure the product. Furthermore, "non-aqueous" dye solvents, which have been proposed, such as alcohol, acetone, etc., "burn" or otherwise injure the skin. Finally, it should be noted that wax or oil removal, if necessary, should be carried out prior to dyeing in order to prepare the skin for the entrance of the dye solutions.

In lieu of the suggested direct application to fruit of dye dissolved in kerosene or other "non-aqueous" solvent, it has been proposed to emulsify such a solution in water and to present such a mechanical suspension to the fruit rind. An emulsion being a non-homogeneous suspension in one liquid of globules of a second liquid, which globules retain their individuality by virtue of adsorbed coatings of an emulsifying agent, it is obvious that the application of dye which is within the coated globules of the emulsion must produce a slow, uneven and unsatisfactory deposition of dye. Deposited on the rind along with the dye, moreover, is a far greater quantity of "non-aqueous" solvent which cannot be allowed to remain and yet cannot be completely rinsed off by water.

Since thorough washing of fruit generally precedes the coloring operation, it is unnecessary as well as unwise to use kerosene or similar oily material with the dye. Furthermore, it is desirable from a practical viewpoint to be able to color fruit products which are dripping wet with water as they come from the wash tank and, as well, to rinse off from the colored fruit the excess dye solution by the use of water sprays. Wet fruit repels an oily dye solution, and fruit colored with an oily solution cannot be rinsed clean with water. The results are uneven coloring and unsatisfactory reception of the wax coatings which are customarily applied to the fruit. In order to make the coloring process fit into the general orange-packing house procedure wherein fruit is passed through at the rate of several carloads a day, the dye solution should be "aqueous" and should be a homogeneous solution, not a heterogeneous mechanical suspension or emulsion.

The present process is a true dyeing process. Dyeing, as distinguished from coating, is an art clearly set forth as follows: (Encycl. Brit. 11th ed. vol. VIII, p. 745)

"True dyeing can only result when the coloring matter is presented to the fibre in a soluble condition, and is then, by some means or other, rendered insoluble while it is absorbed by, or is in direct contact with, the fibre. There must always be some marked physical or chemical affinity existing between fibre and coloring matter, and this depends upon the physical and chemical properties of both."

According to the present invention, there is applied to the skin of the fruit to be colored, as by spraying, brushing, dipping or other suitable operation, a coloring composition consisting of a solution of a water-insoluble dye in a composite solvent consisting essentially of water but containing additional material dissolved therein, thus constituting a solvent for the dye. When the coloring composition comes into contact with the fibres of the skin or rind of the fruit, the dye is adsorbed or otherwise rendered insoluble and is deposited within and upon the fibres, for which it has a greater affinity than it does for the solution constituting the coloring composition.

The dye solution employed in the present process is compounded preferably by dissolving in water an additional material or materials, which, when dissolved in the water, even in relatively small quantities, form, with the water, a solvent for certain dyes of the water-insoluble, "oil-soluble" class. (This additional material is designated hereinafter as an "aquasolufacient".) Thereafter, a harmless and preferably certified food dye of the water-insoluble class is dissolved in the composite aqueous solvent.

The dye solution may be applied to the fruit to be colored in any one of several ways, as by spraying, brushing, or wiping onto the surface of the fruit or by immersing the fruit in a bath of the coloring composition. Certain minor changes may be found desirable in the composition to render it more efficient in the various methods of applying, but a composition prepared according to the invention is suitable for application to the fruit in any desired manner.

The process according to the present invention may be practiced by applying the composition to the fruit immediately after the fruit has been discharged from the usual washing operation and without previously drying the fruit. However, if desired, the fruit may be colored according to the present process after having been washed and dried in a known manner. It should not, however, be allowed to remain dry very long before dyeing.

Preferably, the process is carried out at a temperature of approximately 125° to 130° F., the fruit being exposed to the coloring composition for a period of one to two minutes. The temperature of the composition may range from approximately 120° to 135° F., and may be as high as 140° F. Although the process may be carried out at considerably higher temperatures than those given, preferably the temperature should not exceed 140° F., as the fruit may be injured unless the exposure to such temperature is very short. It should be understood that the length of time necessary for satisfactory dyeing is inversely proportional to the temperature of the coloring composition, although not necessarily in linear function.

The dye employed in compounding the color composition according to the present invention may consist of any suitable water-insoluble, harmless, food-product dye, but preferably of oil-soluble "yellow" dyes such as benzene-azo-beta-napthylamine ($C_{16}H_{13}N_3$) or o-toluene-azo-beta-naphthylamine ($C_{17}H_{15}N_3$), or of mixtures of both. Another suitable dye is benzene-azo-beta-naphthol ($C_{16}H_{12}N_2O$), although this latter is not a certified dye and its use for food products would not be permitted. Where the term "oil-soluble" is used herein, it will be understood as designating that class of dyes which is known to the trade under the name of "oil-soluble" dyes.

Although the present process is described with reference to the coloring of orange-colored fruits, such as oranges, tangerines and the like, it is to be understood that the invention is not thus limited. When it is desired to impart to food products colors other than orange, oil-soluble dyes of the desired color may be substituted for the dyes specifically mentioned herein, and the process otherwise carried out in the manner described.

The additional material or aquasolufacient, which is employed with water to make a dye solvent, may be one or more substances selected from the class of fatty alcohol sulfates and/or sulfonates. Examples of materials of the first class are the alkyl sodium sulfates, sodium lauryl sulfate, sodium oleyl sulfate, sodium myristyl sulfate, sodium stearyl sulfate, the corresponding sulfonates and the like. Any sodium salt of the half sulfuric esters of the higher fatty alcohols is suitable, but the compounds of this class having the same number of carbon atoms as are contained in the saponifiable fats and oils are the more suitable.

Another class of materials suitable for use as aquasolufacients are compounds of the fatty acid sulfonates analogous to the compounds of the fatty alcohol sulfates and sulfonates above-mentioned of which the sodium oleic acid ester of a sulfonated aliphatic compound is one example. Another example is a sodium oleic acid ester of a sulfonated ester.

A third class of materials suitable for use as aquasolufacients are the so-called "sulfonated oils" which are made by sulfonation of fatty oils, e. g. castor oil, olive oil, etc. These products have been heretofore used as mordants in the textile dyeing industry. They have also served as detergents and as softening agents for fibres of textiles. The sulfonated oils of "75% Grade" or higher are more suitable as aquasolufacients than are those of lower grade as regards degree of sulfonation. It is understood that all sulfonated oils are partially neutralized, after sulfonation, by the use of alkalies.

Instead of a sulfate or sulfonate derivative of a fatty alcohol or of a fat or fatty acid as above-described, the aquasolufacient may consist of one of the water-soluble salts of fatty acids, which are commonly known as soaps. Examples of such materials are mono-, di-, or triethanolamine salts of oleic or other fatty acids or sodium or potassium salts of fatty acids. Although commercial soaps which are substantially free from fillers may be used, preferably, soaps, made especially for the purpose from alkali hydroxides and from commercially pure oleic or other fatty acids, are employed.

It has also been found that combinations of two or more of the above-mentioned types of aquasolufacients may be employed. Thus, for example, there may be used a fatty alcohol sulfate and/or sulfonate with a fatty acid sulfonate, a fatty alcohol sulfate or sulfonate with an alkali salt of a fatty acid, a fatty acid sulfonate with an alkali salt of a fatty acid, or any combination of three or four of the foregoing.

Certain of the aforementioned materials are obtainable under trade names, and certain other proprietary materials having similar properties are also suitable. Such materials are listed hereinafter, the names of the dealers and the probable chemical designations being set opposite the respective trade names:

| Trade name | Dealer | Chemical classification |
| --- | --- | --- |
| Gardinols | National Aniline & Chemical Co., Inc., New York, N. Y. | Alkyl sodium sulfates. |
| Avirols | DuPont Co., Wilmington, Del. | Do. |
| Dreft | Procter & Gamble Co., Cincinnati, Ohio. | Alkyl sodium sulfate soap. |
| Texitol | Carbide & Carbon Chem. Corp., New York, N. Y. | Alkyl sodium sulfates. |
| Dispersaid | Binney & Smith, New York, N. Y. | Do. |
| Arctic syntex | Colgate-Palmolive-Peet Co., Jersey City, N. J. | Oleic acid ester of a sulfonated aliphatic ester. |
| Sulfonated oils | American Cyanamid Co., New York, N. Y. | Sulfonation products from castor-oil, etc. |

Example I

An operable solution, in accordance with the present invention, may be prepared as follows: 0.30 part by weight of a fatty alcohol sulfate, such as sodium lauryl sulfate, and 99.65 parts of water are heated to a temperature from 125° F. to 135° F. and gently stirred or agitated until all of the sodium lauryl sulfate is dissolved. Thereafter, 0.05 part of benzene-azo-beta-naphthylamine are added to the solution, and stirred or agitated until completely dissolved. The operation is more quickly executed by warming, at about 130° F., the dye and the sodium lauryl sulfate with from 2% to 5% of the water, and then adding the remaining water at 130° F.

Example II

Another operable solution may have the following composition, the parts being by weight:—

| | Parts |
|---|---|
| Fatty acid sulfonate (e. g. sodium oleic acid ester of a sulfonated aliphatic compound) | 0.30 |
| Dye (e. g. benzene-azo-beta-naphthylamine) | 0.05 |
| Water | 99.65 |

Example III

Still another operable solution may have the following composition, the parts being by weight:

| | Parts |
|---|---|
| Fatty acid salt (e. g. an ethanolamine oleate) | 0.60 |
| Dye (e. g. benzene-azo-beta-naphthol) | 0.03 |
| Water | 99.37 |

Example IV

Still another operable solution may have the following composition:

| | Parts |
|---|---|
| Fatty alcohol sulfate or fatty acid sulfonate | 0.05 |
| Soap (e. g. sodium oleate) | 0.45 |
| Dye (e. g. o-toluene-azo-beta-naphthylamine) | 0.05 |
| Water | 99.45 |

Where it is desired to combine a mould or fungus-inhibiting material with the coloring composition, this may be done by including in the coloring composition a suitable material such as borax. Inasmuch as the detergent action of the coloring composition removes substantially all of the spores of mould or other fungi spores, the antiseptic treatment is not so necessary as where the dyeing operation is not performed.

Example V

An operable solution carrying out the combined coloring and sterilizing operation may have the following composition:

| | Parts |
|---|---|
| Fatty alcohol sulfate (e. g. sodium lauryl sulfate) | 0.05 |
| Soap (e. g. sodium oleate) | 0.45 |
| Dye (any of above-mentioned dyes) | 0.05 |
| Borax | 3.00 |
| Water | 96.45 |

This composition may be compounded in the manner similar to the above-described compositions, the borax being added either before or after the dye.

Example VI

If desired, a stock solution or paste may be prepared in concentrated form, in order to facilitate storing and shipping, and the stock solution may be diluted to the desired concentration just prior to using. A suitable stock solution may have the following composition:

| | Parts |
|---|---|
| Dye (e. g. benzene-azo-beta-naphthylamine) | 1.5 |
| Aquasolufacient (e. g. sodium oleate) | 32.5 |
| Water | 66.0 |

The stock solution may have any consistency from paste to liquid, but the proportions above-mentioned have been found to be well adapted for general use.

The above stock solution may be employed for making up, by dilution, the operating dye bath. For the fortifying of that bath I use a fortifying solution which may be made as follows:

| | Parts |
|---|---|
| Acetone or denatured alcohol | 95 |
| Dye (e. g. benzene-azo-beta-naphthylamine) | 5 |

The fortifying solution is fed to the operating solution as needed, to replace dye which has been used up, and thus the solution is maintained at constant strength, preferably at or near saturation.

Example VII

Another example of a suitable dye solution is one containing a sulfonated oil as the aquasolufacient. This is prepared as follows:

A 1% solution of sulfonated castor oil in water is prepared. The sulfonated castor oil may be of 50%, 75% or 90% sulfonation, or mixtures of two or more. In this there is dissolved, by agitation, 0.05% of benzene-azo-beta-naphthylamine. A satisfactory solution using sulfonated castor oil may be prepared using from 0.4% to 1.0% of sulfonated castor oil and from 0.02% to 0.05% of dye.

A stock solution of this may be made as follows:

One part of sulfonated castor oil is dissolved in one part of water and 1/20 part of benzene-azo-beta-naphthylamine is dissolved therein by agitation. The addition of an alkali hydroxide in an amount at least equal to one-half of the usual acidity of the sulfonated oil is desirable for stabilizing purposes, and this may amount to 70% to 80% of the total of the free acid. Preferably, this should be added after dilution with water and before the addition of dye.

It should be noted that the solutions compounded from sulfonated oils are especially suitable for dyeing processes such as spray dyeing wherein there is considerable agitation of the solution. It has been found that when agitated, solutions containing materials such as soaps are subject to "frothing". However, the froth resulting from the use of sulfonated oils is of such an evanescent character as to cause substantially no difficulty even with violent agitation.

The ingredients employed in compounding the solution according to the present invention may vary considerably as to proportions. Preferably, sufficient dye will be included to maintain the solution at the saturation point, and generally this amount will be found to be of a low order, preferably from 0.02% to 0.06%, usually less than 0.05% for the specific dyes mentioned. The aquasolufacient necessary to prepare a suitable solution will usually range from 0.15% to 2.00%.

Soft water may be used in making up all of the compositions according to the foregoing methods, or, if desired, hard water may be softened in the usual manner by the use of lime and soda, or by salt in a "Permutit" type softener. However, it is not so necessary to soften hard water when the accessory solvent is a sodium fatty alcohol sulfate, or sulfonate or a fatty acid ester of a sulfonated aliphatic compound which may be an ester.

The solution may be stabilized against decomposition by hydrolysis and against the deleterious effects of juice from crushed fruit and against decomposition by contact with reactive substances in the apparatus. This stabilization may be accomplished by including a sufficient amount of an ethanolamine or other alkaline compound in the composition. Generally, from one tenth to two tenths percent in excess is sufficient, but less is usually needed.

Preferably, the surfaces of the apparatus which are in contact with the solution are coated with lacquer or spar varnish in order to prevent corrosion or electrolytic decomposition thereof.

By the use of the present process, a uniform, even deposition of dye on the skin is effected, and consequently no unnatural appearance results. As previously set forth, the fruit may be rinsed immediately after the dyeing operation to thereby remove substantially all of the coloring composition except the dye proper, which has become a part of the fibre. Thus, blotching and uneven coloration are prevented.

Since the fruit may be dyed immediately after washing, and without previous drying, and may be rinsed and waxed immediately after dyeing, and since the dyeing process proper consumes only one or two minutes for completion, the process according to the present invention may be carried out in a minimum of time, and with minimum amount of labor and apparatus.

What is claimed is:

1. The method of improving the natural coloration of the skin of citrus fruit which comprises, applying to the fruit a dye composition consisting substantially of water, an oil-soluble, water-insoluble dye, and an aquasolufacient, whereby to deposit said dye within and upon the skin of the fruit.

2. The method of improving the natural coloring of the skin of citrus fruit which comprises, applying to the fruit a coloring composition including water, an oil-soluble, water-insoluble dye, and a material dissolved in the water which, together with the water, forms a liquid in the nature of a solvent for the dye, whereby to deposit the dye on the skin of the fruit.

3. The method of improving the natural color of the skin of citrus fruit which comprises, applying to the skin of the fruit a dye composition including an oil-soluble, water-insoluble dye, and a predominantly aqueous liquid rendered capable of dispersing the dye substantially to the extent of forming a true solution by the addition of an aquasolufacient to water, whereby to deposit said dye upon the skin of the fruit.

4. The method of improving the natural coloration of the skin of citrus fruit which comprises, applying to the skin of the fruit a dye composition substantially free from suspended emulsified particles and including water, an oil-soluble, water-insoluble dye in a state of substantially molecular dispersion, and one or more materials selected from the group consisting of fatty acid esters, fatty acid sulfonates and fatty alcohol sulphates, whereby to deposit said dye upon and within the skin of the fruit.

5. The method of improving the natural coloration of skin of citrus fruit which comprises applying to the skin of the fruit a dye composition including water, an oil-soluble, water-insoluble dye, and a sulfonated oil, whereby to deposit the dye within and upon the skin of the fruit.

6. The method of enhancing the varietal color of citrus fruit which includes, applying to the fruit a dye composition containing an aquasolufacient in the proportion of from .02 to .06 percent of oil-soluble, water-insoluble dye, from .40 to 1.20 percent of an aquasolufacient and the remainder water, whereby to deposit said dye in and upon the skin of the fruit.

JAMES OTIS HANDY.

DISCLAIMER 2,062,903.—*James Otis Handy*, Larchmont, N. Y. DYEING PROCESS. Patent dated December 1, 1936. Disclaimer filed July 7, 1938, by the assignee, *Albert M. Austin*, as trustee.

Hereby disclaims from the scope of claim 1 of said Letters Patent any process of coloring citrus fruits wherein the aquasolufacient consists of saponin or a water-soluble soap of oleic, stearic, palmitic, linolic or other fatty or petroleum acids; and hereby disclaims from the scope of claim 2 of said Letters Patent any process of coloring citrus fruits wherein the material dissolved in the water, which, together with the water, forms a liquid in the nature of a solvent for the dye, consists of saponin or a water-soluble soap of oleic, stearic, palmitic, linolic or other fatty or petroleum acids.

[*Official Gazette August 2, 1938.*]